(12) United States Patent
White

(10) Patent No.: US 12,742,554 B2
(45) Date of Patent: Sep. 22, 2026

(54) FAULT RESET SYSTEM FOR AN APPLIANCE

(71) Applicant: Haier US Appliance Solutions, Inc., Wilmington, DE (US)

(72) Inventor: Robert Turner White, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 205 days.

(21) Appl. No.: 18/644,831

(22) Filed: Apr. 24, 2024

(65) Prior Publication Data

US 2025/0334271 A1 Oct. 30, 2025

(51) Int. Cl.

| | |
|---|---|
| ***G06F 3/044*** | (2006.01) |
| ***F24C 3/12*** | (2006.01) |
| ***F24C 7/08*** | (2006.01) |
| ***G06F 3/041*** | (2006.01) |
| *H05B 3/74* | (2006.01) |

(52) U.S. Cl.

CPC .............. *F24C 7/086* (2013.01); *F24C 3/126* (2013.01); *G06F 3/0418* (2013.01); *G06F 3/044* (2013.01); *H05B 3/74* (2013.01)

(58) Field of Classification Search

CPC ........ F24C 7/086; F24C 3/126; G06F 3/0418; G06F 3/044

See application file for complete search history.

(56) References Cited

U.S. PATENT DOCUMENTS

| | | | | |
|---|---|---|---|---|
| 9,471,121 | B2 | 10/2016 | Saha et al. | |
| 10,394,361 | B2 | 8/2019 | Park | |
| 10,761,580 | B2 | 9/2020 | Suryanarayanan et al. | |
| 11,526,245 | B2 | 12/2022 | Aoki et al. | |
| 2009/0170641 | A1* | 7/2009 | Qin | G09B 19/00 473/422 |
| 2010/0175762 | A1* | 7/2010 | Anacrelico | A47L 15/421 137/387 |
| 2011/0115296 | A1* | 5/2011 | Watson | H02J 9/005 307/66 |
| 2014/0214181 | A1* | 7/2014 | Ghazanfari | G05B 19/042 700/23 |
| 2015/0193075 | A1* | 7/2015 | Chang | G06F 3/0418 345/173 |
| 2017/0327990 | A1* | 11/2017 | Lee | D06F 37/42 |
| 2017/0344178 | A1* | 11/2017 | Vekhter | G06F 3/0445 |
| 2019/0102034 | A1* | 4/2019 | Nam | G06F 3/041661 |
| 2019/0157885 | A1* | 5/2019 | Rippel | H02M 1/32 |
| 2021/0011660 | A1* | 1/2021 | Ono | G06F 3/0619 |
| 2021/0095855 | A1* | 4/2021 | Cowan | F24C 3/124 |

(Continued)

FOREIGN PATENT DOCUMENTS

| | | |
|---|---|---|
| CN | 208015700 U | 10/2018 |
| CN | 113810032 A | 12/2021 |

*Primary Examiner* — Dominic E Hawkins

(74) *Attorney, Agent, or Firm* — Dority & Manning, P.A.

(57) ABSTRACT

A fault reset system for an appliance is provided. The fault reset system includes a controller comprising a sensing circuit, the sensing circuit configured to determine one or more sensor values associated with one or more capacitive touch sensors of the appliance. The fault reset system further includes a reset circuit configured to reset the sensing circuit based on a reset signal provided by the controller. The reset circuit is configured to reset the sensing circuit by power cycling the controller.

18 Claims, 9 Drawing Sheets

(56) References Cited

U.S. PATENT DOCUMENTS

| | | | | |
|---|---|---|---|---|
| 2021/0180813 | A1 | 6/2021 | Aoki et al. | |
| 2022/0271747 | A1 | 8/2022 | Takano et al. | |
| 2022/0404024 | A1* | 12/2022 | Neal | F24C 7/08 |
| 2024/0019128 | A1* | 1/2024 | Gaessler | F24C 7/086 |

* cited by examiner

700

FAULT RESET SYSTEM FOR AN APPLIANCE

FIELD

Example aspects of the present disclosure relate generally to resetting a controller in an appliance and more particularly to resetting an internal sensing circuit (e.g., internal sensing peripheral) of a controller in an appliance.

BACKGROUND

Domestic appliances may include appliances such as refrigerators, dishwashers, microwave ovens, cooktops, ovens, washing machines, dryers, water heaters, water filters or purifiers, air conditioners, space heaters, or any other household appliance which performs similar functions. These appliances generally include controllers (e.g., processors, microprocessors, microcontrollers) configured to determine sensor values from the sensors of the appliance. Some controllers include internal sensing circuits (e.g., application specific peripherals) within a device package of the controller. These sensing circuits may be configured to determine a sensor value of a capacitive touch sensor by detecting a change in the capacitance of a sensor.

SUMMARY

Aspects and advantages of embodiments of the present disclosure will be set forth in part in the following description, or can be learned from the description, or can be learned through practice of the embodiments.

One example aspect of the present disclosure is directed to a fault reset system for an appliance. The fault reset system includes a controller comprising a sensing circuit, the sensing circuit configured to determine one or more sensor values associated with one or more capacitive touch sensors of the appliance. The fault reset system further includes a reset circuit configured to reset the sensing circuit based on a reset signal provided by the controller. The reset circuit is configured to reset the sensing circuit by power cycling the controller.

Another example aspect of the present disclosure is directed to a method for resetting a controller in an appliance. The method includes determining, by a sensing circuit of the controller, one or more sensor values associated with one or more capacitive touch sensors of the appliance. The method further includes providing a reset signal based at least in part on a fault state of the sensing circuit. The method further includes resetting the sensing circuit based at least in part on the reset signal. Resetting the sensing circuit includes power cycling the controller.

Another example aspect of the present disclosure is directed to an appliance. The appliance includes one or more capacitive touch sensors configured to provide one or more sensor signals. The appliance further includes a fault reset system. The fault reset system includes a controller comprising a sensing circuit, the sensing circuit configured to determine one or more sensor values associated with one or more capacitive touch sensors of the appliance. The fault reset system further includes a reset circuit configured to reset the sensing circuit based on a reset signal provided by the controller. The reset circuit is configured to reset the sensing circuit by power cycling the controller.

These and other features, aspects and advantages of various embodiments will become better understood with reference to the following description and appended claims.

The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

Figure 1:
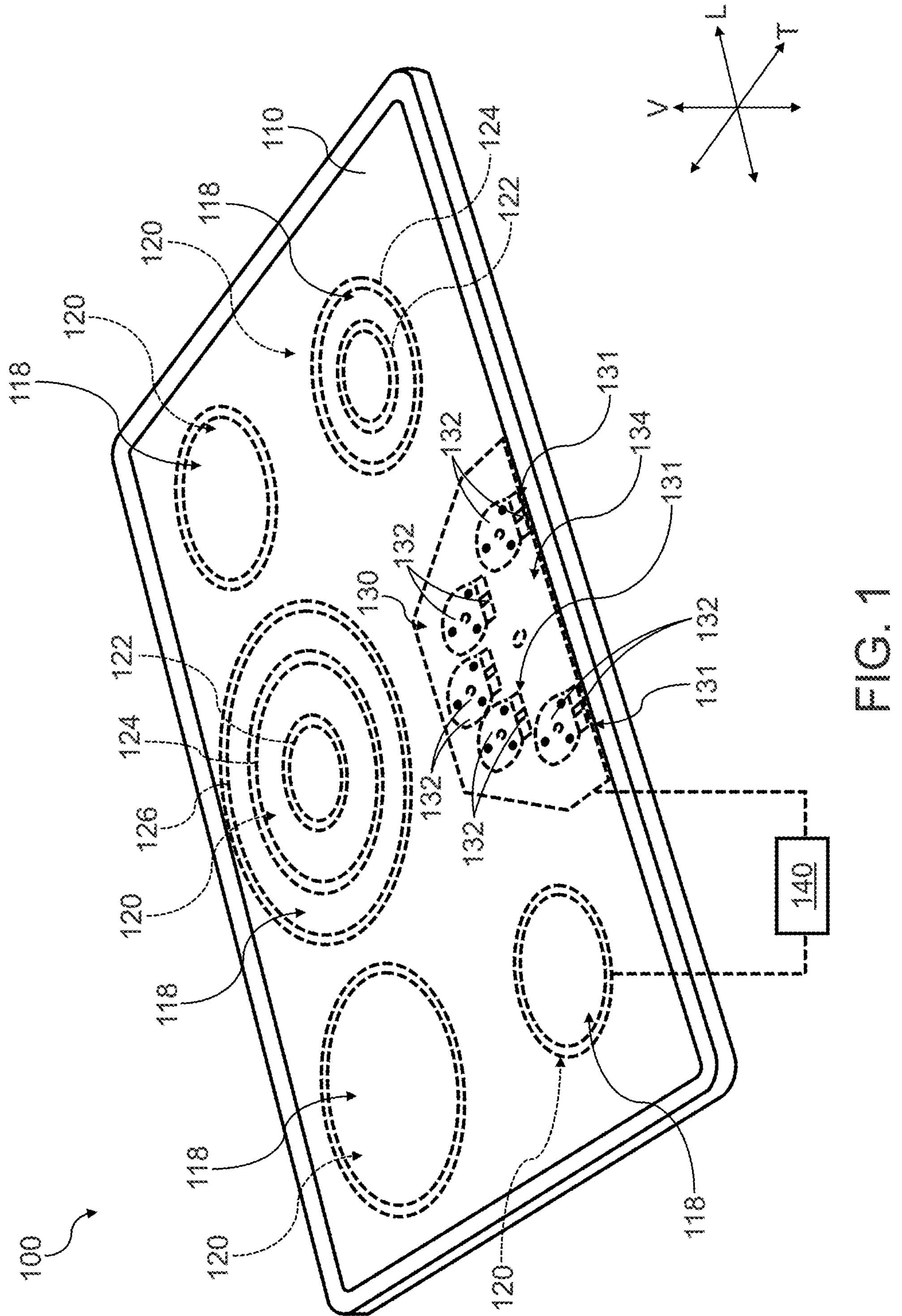
FIG. 1 illustrates a perspective view of an appliance according to example embodiments of the present disclosure.

Repeat use of reference characters in the present specification and drawings is intended to represent the same and/or analogous features or elements of the present invention.

DETAILED DESCRIPTION

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to a fault reset system for an appliance. Many controllers (e.g., processors, microprocessors, microcontrollers) have internal, application specific peripherals (e.g., sensing circuits) within the device package of the controller. One such internal peripheral is a capacitive touch sensing peripheral, which is configured to detect a change in capacitance of a sensor (e.g., capacitive touch sensor). The order of magnitude of change in capacitance may generally be in the picofarad range, requiring the peripheral to be extremely sensitive to electrical energy. Accordingly, the capacitive touch sensing peripheral may be put in a fault state (e.g., unable to measure capacitance of the sensor) in the event of high amounts of electrical energy being applied to the sensor. Some peripherals may recover from a fault state using a software-reset. However, an internal peripheral, as described herein, is an internal component of the controller and may only be initialized during a power startup of the controller. Accordingly, the peripheral may only recover from a fault state by a full power reset of the controller. In some instances, such as when the controller is implemented in an appliance, a breaker may have to be cycled in order to reset the controller. For many users, cycling a breaker is time consuming and undesirable.

As such, example aspects of the present disclosure provide a way of resetting an internal peripheral of a controller within an appliance without cycling a breaker. Specifically, a power reset circuit is disclosed that enables the controller to reset the internal peripheral by cycling power to itself when the internal peripheral (e.g., sensing circuit) is identified to be in a fault state (e.g., unable to measure capacitance of the sensor). Additionally, a method for determining that the internal peripheral (e.g., sensing circuit) is in a fault state is provided.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (e.g., "A or B" is intended to mean "A or B or both"). The term "at least one of" in the context of, e.g., "at least one of A, B, and C" refers to only A, only B, only C, or any combination of A, B, and C. In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

The terms "coupled," "fixed," "attached to," and the like refer to both direct coupling, fixing, or attaching, as well as indirect coupling, fixing, or attaching through one or more intermediate components or features, unless otherwise specified herein.

Except as explicitly indicated otherwise, recitation of a singular processing element (e.g., "a controller," "a processor," "a microprocessor," etc.) is understood to include more than one processing element. In other words, "a processing element" is generally understood as "one or more processing element." Furthermore, barring a specific statement to the contrary, any steps or functions recited as being performed by "the processing element" or "said processing element" are generally understood to be capable of being performed by "any one of the one or more processing elements." Thus, a first step or function performed by "the processing element" may be performed by "any one of the one or more processing elements," and a second step or function performed by "the processing element" may be performed by "any one of the one or more processing elements and not necessarily by the same one of the one or more processing elements by which the first step or function is performed." Moreover, it is understood that recitation of "the processing element" or "said processing element" performing a plurality of steps or functions does not require that at least one discrete processing element be capable of performing each one of the plurality of steps or functions.

Referring now to FIG. 1, a top, perspective view of a cooktop appliance 100 according to an example embodiment of the present subject matter is provided. Cooktop appliance 100 can be installed in various locations such as in cabinetry in a kitchen, with one or more ovens to form a range appliance, or as a standalone appliance. Thus, as used herein, the term "cooktop appliance" may include grill appliances, stove appliances, range appliances, and other appliances that incorporate cooktops, which are generally known as surface cooking appliances. It should be understood that the present disclosure is not limited to cooktop appliances 100, and rather that any appliance having a one or more capacitive touch sensors may be within the scope and spirit of the present disclosure.

Cooktop appliance 100 may include a cooking panel 110 for supporting cooking utensils such as pots or pans thereon. Cooking panel 110 is a generally transparent material that may be constructed from, e.g., glass, ceramics, and/or combinations thereof.

Cooking panel 110 may include one or more cooking zones 118. As shown in FIG. 1, cooking zones 118 may be generally circular in shape and may have various diameters. For example, each cooking zone 118 can have a different diameter, the same diameter, or any suitable combination thereof. In other embodiments, cooking zones 118 may be generally rectangular in shape, and each cooking zone 118 may have the same length and width, a different length and width, or any suitable combination thereof. In still other embodiments, cooking zones 118 may have any suitable shape and size, and in some embodiments, cooking panel 110 may include cooking zones 118 of various shapes and sizes, e.g., a combination of circular and rectangular cooking zones 118. Further, while shown with five cooking zones 118 in the example embodiment of FIG. 1, in alternative example embodiments, cooktop appliance 100 may include any number of cooking zones 118.

A heating assembly 120 may be mounted below cooking panel 110 adjacent to each cooking zone 118 such that heating assemblies 120 are positioned below cooking panel 110, e.g., along a vertical direction V. Each heating assembly 120 may comprise a single heating element or a plurality of heating elements or sub-elements, such as a first heating element 122, a second heating element 124, and/or a third heating element 126 as shown in FIG. 1, with each heating element or sub-element contributing to the power density of the respective cooking zone 118. For each heating assembly having more than one heating element, heating elements 122, 124, and/or 126 may be activated individually or in conjunction with one or both of the other heating elements 122, 124, 126. For example, for a given heating assembly 120, first heating element 122 may be activated individually, with second heating element 124, with third heating element 126, or with both second heating element 124 and third heating element 126. As an additional example, for a heating assembly 120 comprising two heating elements, such as first heating element 122 and second heating element 124, both heating elements 122, 124 may be activated individually or simultaneously. Thus, using heating assemblies 120 having multiple heating elements, cooking zones 118 may vary in size and/or power density.

Cooktop appliance 100 is provided by way of example only and is not limited to the example embodiment shown in FIG. 1. For example, a cooktop appliance having one or more heating assemblies in combination with one or more electric or gas burner heating elements can be provided. In addition, various combinations of number of heating assemblies, position of heating assemblies, and/or size of heating assemblies can be provided. Moreover, heating assemblies 120 can have a variety of constructions for the input of energy in the form of heat to the cooking utensils. For example, heating assemblies 120 can be constructed as electric radiant or gas-on-glass heating sources. Mechanisms associated with each such type of heating source are positioned under cooking panel 110 adjacent cooking zones 118 and will be well understood of one of skill in the art using the teachings disclosed herein.

A user interface 130 allows a user to interact with cooktop appliance 100. For example, user interface 130 may include a selection portion 131 for each cooking zone 118, and within selection portion 131, a user may select which heating element or elements of the associated heating assembly 120 the user desires to be activated and information may be displayed to the user such as which heating element or elements is active and/or at what size or power density has been selected for cooking zone 118. The selection portion 131 includes one or more capacitive touch sensors 132 (e.g., capacitive touch input components), which can send a sensor signal to appliance control system 140 to allow for the selective activation, adjustment, or control of any or all heating assemblies 120. Capacitive touch sensors 132 may also be provided for the selective activation, adjustment, or control of any timer features or other user adjustable inputs. One or more of a variety of electrical, mechanical or electro-mechanical input devices including rotary dials, push buttons, toggle/rocker switches, and/or touch pads can also be used singularly or in combination with capacitive touch sensors 132. User interface 130 may also include a display component 134, such as a digital or analog display device designed to provide operational feedback to a user. Selection portion 131 of user interface 130 is further described below.

Along with one or more capacitive touch sensors 132, user interface 130 may include any additional type of input device and can have any configuration. In FIG. 1, user interface 130 is located within a portion of cooking panel 110. Alternatively, user interface 130 can be positioned on a vertical surface near a front side of cooktop appliance 100 or anywhere convenient for a user to access during operation of cooktop appliance 100. In some embodiments, cooktop appliance 100 may be a range cooktop. In such embodiments, user interface 130 may be positioned on a backsplash of the range.

Also, although described with respect to cooktop appliance 100, it should be readily understood that user interface 130 and appliance control system 140 as described herein could be used with any suitable appliance. When used with other appliances, such as, e.g., washing machine appliances, dryer appliances, and/or refrigerator appliances, panel 110 may be constructed of glass, ceramics, plastics, and/or combinations thereof. Suitable plastic materials may include acrylics, polyethylene terephthalate ("PET"), or the like. In some embodiments, user interface 130 may be incorporated into or may form the control panel of an appliance; for example, user interface 130 may be incorporated into a backsplash of a washing machine or dryer appliance.

Operation of cooktop appliance 100 can be regulated by appliance control system 140 that is operatively coupled, i.e., in communication with, user interface 130 (e.g., capacitive touch sensors 132) and heating assemblies 120, including first heating elements 122, second heating elements 124, and third heating elements 126. For example, in response to user manipulation of a capacitive touch sensor 132, appliance control system 140 may operate one of heating assemblies 120, e.g., by operating one or more of heating elements 122, 124, 126.

In some embodiments, appliance control system 140 may be defined as including one or more sub-systems configured to interface with specific elements of the device. Each sub-system may include one or more dedicated controllers (e.g., microcontrollers, microprocessors) and other circuitry. For example, appliance control system 140 may include a first sub-system configured communicate with user interface 130 (e.g., capacitive touch sensors 132) and a second sub-system configured to communicate with heating assemblies 120 based on input from the first sub-system. Alternatively, appliance control system 140 may include a single controller in communication with, user interface 130 (e.g., capacitive touch sensors 132) and heating assemblies 120, including first heating elements 122, second heating elements 124, and third heating elements 126.

It should be noted that appliance control system 140 as disclosed herein is capable of and may be operable to perform any methods and associated method steps as disclosed herein. For example, in some embodiment, methods disclosed herein may be embodied in programming instructions stored in the memory and executed by the appliance control system 140.

Appliance control system 140 may be positioned in a variety of locations throughout cooktop appliance 100. In the illustrated embodiment, appliance control system 140 may be located under or next to the user interface 130. In such an embodiment, input/output ("I/O") signals are routed between the controller and various operational components of cooktop appliance 100 such as heating assemblies 120, capacitive touch sensors 132, graphical displays, and/or one or more alarms. In one embodiment, the user interface 130 may represent a general purpose I/O ("GPIO") device or functional block. Accordingly, one or more capacitive touch sensors 132 may be in communication with appliance control system 140 via one or more GPIO signals or shared communication busses.

Figure 2:
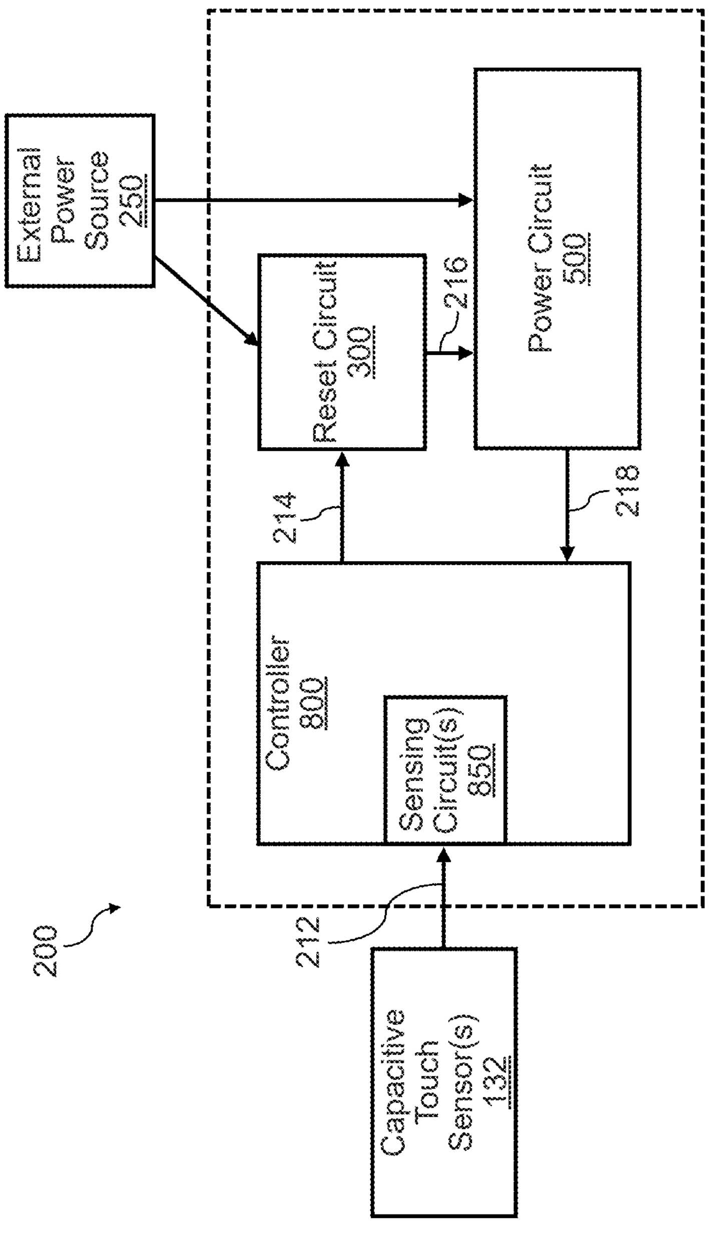
FIG. 2 depicts a block diagram of an example fault reset system according to example embodiments of the present disclosure.

FIG. 2 depicts a block diagram of a fault reset system 200 according to example embodiments of the present disclosure. Fault reset system 200 may be implemented as an appliance control system, such as appliance control system 140 depicted in FIG. 1. In some embodiments, fault reset system 200 may be implemented in appliance control system 140 as a sub-system. For example, appliance control system 140 of FIG. 1 may include fault reset system 200 configured communicate with user interface 130 (e.g., capacitive touch sensors 132), while a second sub-system of appliance control system 140 is configured to communicate with heating assemblies 120 based on input from fault reset system 200. Additionally, fault reset system 200 may be implemented in any suitable domestic appliance, such as cooktop appliance 100 of FIG. 1 or any appliance that includes one or more capacitive touch sensors.

Fault reset system 200 includes a controller 800. Controller 800 is configured to receive a sensor signal 212 from capacitive touch sensor 132 such as that described above in reference to FIG. 1. As shown, controller 800 includes an internal sensing circuit 850 (e.g., internal capacitive touch sensing peripheral) configured to determine a sensor value associated with capacitive touch sensor 132 from the sensor signal 212. Specifically, the sensing circuit 850 may determine the sensor value by detecting changes in the capacitance of the capacitive touch sensor 132 via sensor signal 212.

Capacitive touch sensor 132 and sensor signal 212 may be described herein in the singular tense for purposes of discussion only. As shown in FIGS. 1 and 2, controller 800 may receive one or more sensor signals 212 from one or more capacitive touch sensors 132. For example, one or more capacitive touch sensors 132 may provide one or more sensor signals 212 to sensing circuit 850 of controller 800 via one or more GPIO signals or shared communication busses.

In some instances, sensing circuit 850 may operate in a fault state. As described herein, a fault state may be defined as a state in which the sensing circuit 850 of controller 800 is not accurately determining input to capacitive touch sensor 132. In some embodiments, a high energy event may cause sensing circuit 850 to go into a fault state. For example, if a large amount of electrical energy is present on capacitive touch sensor 132 and gets transmitted to controller 800, this may induce a fault state in sensing circuit 850 such that an input (e.g., a touch) to capacitive touch sensor 132 provides no change to the sensor value determined by the controller 800 (e.g., sensing circuit 850).

As stated above, sensing circuit 850 is an internal sensing circuit (e.g., internal capacitive touch sensing peripheral) of controller 800. Accordingly, sensing circuit 850 shares the same power source as controller 800 (e.g., controller power supply 218) and may be reset by resetting controller 800 (e.g., cycling power to controller 800). In some embodiments, sensing circuit 850 may only be reset (e.g., initialized) when controller 800 is reset. As such, controller 800 is configured to reset sensing circuit 850 by providing reset signal 214 to reset circuit 300.

In some embodiments, controller 800 may perform the self-reset (e.g., providing reset signal 214 to reset circuit 300) when sensing circuit 850 is determined to be in a fault state. For example, controller 210 may provide the reset signal 214 to reset circuit 300 when sensing circuit 850 is in a fault state (e.g., the sensing circuit is determining faulty signal values). Accordingly, controller 800 may be configured to detect that the sensing circuit is in a fault state.

As shown in FIG. 2, fault reset system 200 further includes a reset circuit 300. As stated above, reset circuit 300 allows controller 800 to reset itself. Specifically, reset circuit 300 is configured to reset sensing circuit 850 of controller 800 by cycling power to controller 800. Accordingly, reset circuit 300 may initiate the power cycling based on reset signal 214 provided by controller 800.

Reset circuit 300 includes a delay circuit (e.g., RC circuit) configured to provide a time delay between shutting down and restarting controller 210. In some embodiments, reset circuit 300 may further include a buffer switch (e.g., transistor) configured to protect the controller (e.g., from voltage backfeed).

Figure 3:
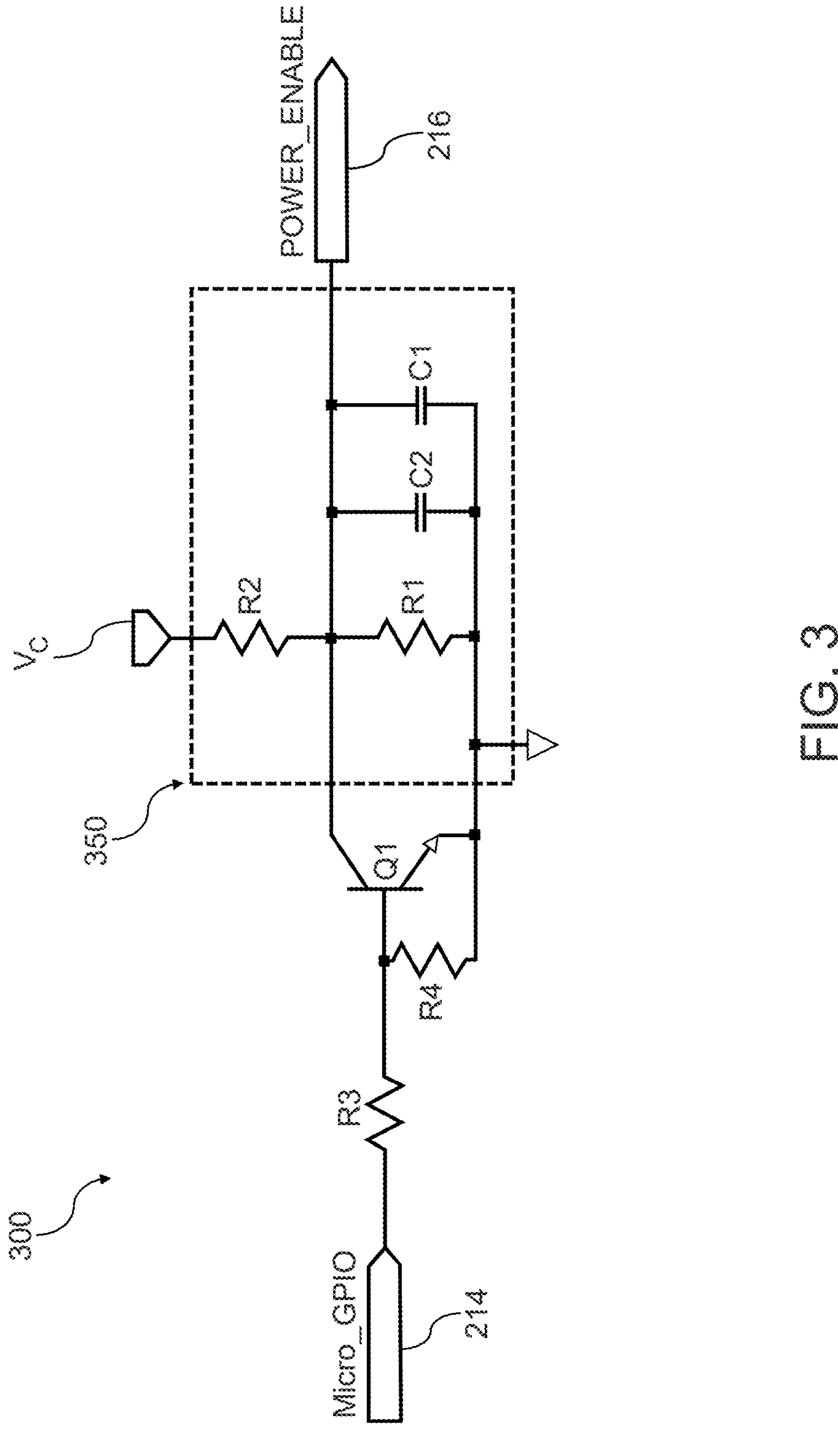
FIG. 3 depicts a circuit schematic of an example reset circuit according to example embodiments of the present disclosure.

Referring now to FIG. 3, an example circuit schematic of a reset circuit according to example embodiments is provided. As shown, reset circuit 300 may receive a reset signal 214 at Micro_GPIO. Reset signal 214 is provided to switching component Q1 of reset circuit 300. In some embodiments, switching component Q1 may be defined as a buffer switch that protects controller 800 (e.g., from voltage backfeed). As such, switching component Q1 may be a transistor. Reset circuit 300 also includes a delay circuit 350 configured to provide a delay between turning off and restarting controller 800. As shown in FIG. 3, delay circuit 350 may be an RC circuit such that it includes one or more capacitors (C1, C2) and one or more resistors (R1, R2).

As depicted, switching component Q1 is controlled (e.g., opened and closed) depending on reset signal 214. When reset signal 214 is low (e.g., below a specified voltage threshold), switching component Q1 is closed, allowing voltage from external power source 250 to flow from $V_C$ through delay circuit 350 to Power_Enable. Reset circuit 300 is configured to supply enable signal 216 at Power_Enable. When reset signal 214 becomes high (e.g., above a specified voltage threshold), switching component Q1 is opened, quickly adjusting the enable signal 216 to 0V. When reset signal 214 is returned to low (e.g., when controller 800 enters an OFF state), switching component Q1 is again closed, allowing voltage from external power source 250 to charge delay circuit 350 (e.g., capacitors C1, C2 of delay circuit 350). As delay circuit 350 charges, the voltage at POWER_ENABLE is slowly increased until enable signal 216 reaches a voltage level to enable power circuit 500. In some embodiments, the buffer switch may alternatively be achieved with a high side switch at any voltage rail upstream of, and including, the controller 800 voltage rail. Such an embodiment is shown below in reference to FIG. 5.

In some embodiments, reset circuit 300 may further include a second switching component (e.g., buffer switch) such as a transistor (e.g., MOSFET) between external power source 250 received at $V_C$ and delay circuit 350.

Figure 4:
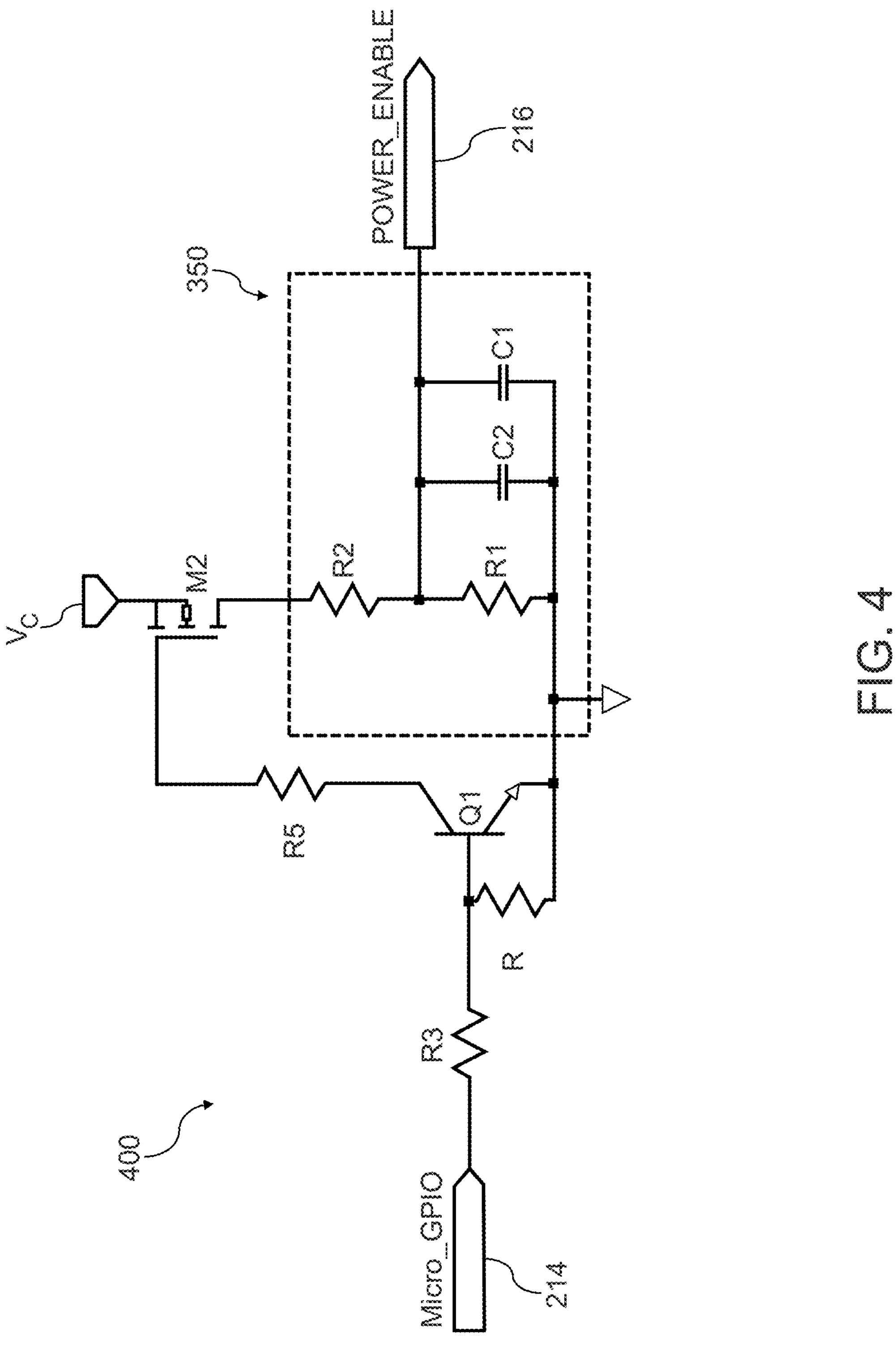
FIG. 4 depicts a circuit schematic of another example reset circuit according to example embodiments of the present disclosure.

As shown in FIG. 4, another example circuit schematic of a reset circuit 400 according to example embodiments is provided. As stated above, repeat use of reference characters in the present specification and drawings is intended to represent the same and/or analogous features or elements of the present invention. Additionally, reset circuit 400 may be implemented in fault reset system 200 as described above in reference to FIG. 2.

In addition to switching component Q1 and delay circuit 350 as described above in reference to FIG. 4, reset circuit 400 may further include switching component M2 such as a transistor (e.g., MOSFET) configured as a high side switch at a voltage rail upstream of, or on, the voltage rail for controller 800. As shown in FIG. 4, reset circuit 400 may further include a resistor R5 located in series between switching component Q1 (e.g., collector pin of switching component Q1) and switching component Q2 (e.g., gate pin of switching component M2). Switching component M2 may be defined as a buffer switch, being configured to protect controller 800 from being damaged in the event of a higher than nominal voltage backfeed from external power source 250.

Referring back to FIG. 2, fault reset system 200 may further include a power circuit 500. As stated above, reset circuit 300 may reset (e.g., shut down and restart) controller 800 by controlling power circuit 500 to cycle power to controller 800. Specifically, reset circuit 300 may send an enable signal 216 to power circuit 500 that controls (e.g., turns on/off) the power supply 218 of controller 800. For example, power circuit 500 may decrease power supply 218 of controller 800 such that controller 800 is switched from an ON state to an OFF state. Further, power circuit 500 may increase power supply 218 of controller 800 such that controller 800 is switched from the OFF state to the ON state.

Additionally, power circuit 500 may turn power supply 218 on or off based on voltage thresholds of enable signal 216. For example, a first voltage threshold (e.g., V_STOP) may define a voltage level of enable signal 216 at which the power circuit 500 turns off power supply 218. Additionally, a second voltage threshold (e.g., V_START) may define a voltage level of enable signal 216 at which the power circuit 500 turns back on power supply 218.

In some embodiments, power circuit 500 is configured to regulate power supply 218 of controller 800. As shown in FIG. 2, power circuit 500 may receive power from an external power source 250. Power circuit 500 may include one or more voltage converters to convert (e.g., step down) the voltage of external power source 250 to an acceptable voltage for controller 800.

Figure 5:
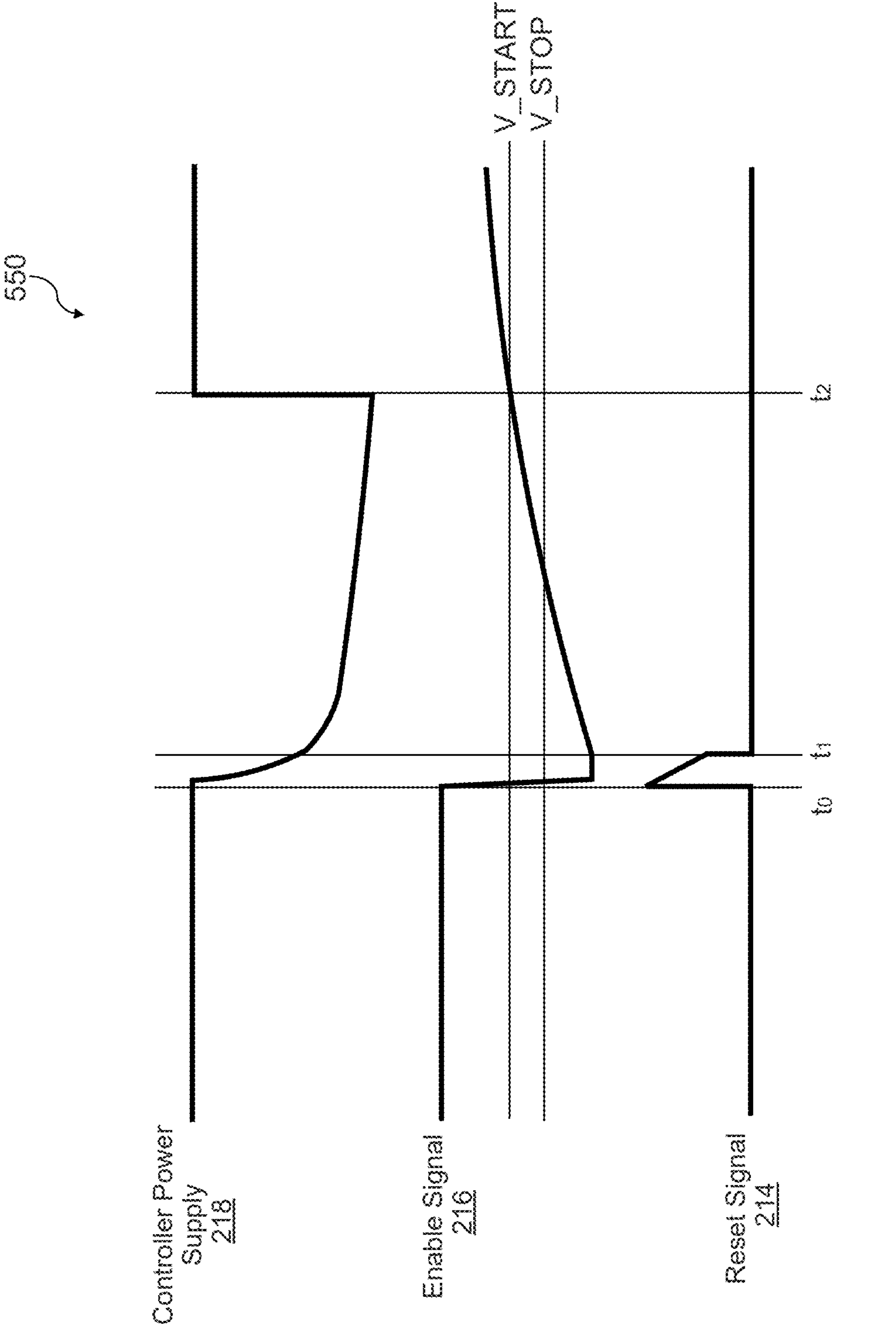
FIG. 5 depicts a graphical representation of example signals of the fault reset system according to example embodiments of the present disclosure.

FIG. 5 provides a graphical representation of example signals 550 of the fault reset system according to example embodiments of the present disclosure. While FIG. 5 is disclosed with reference to fault reset system 200 of FIG. 2, those of ordinary skill in the art will understand that example signals 550 may be provided by any suitable fault reset system. Specifically, example signals 550 depict signals of a fault reset system while resetting a sensing circuit of a controller by power cycling the controller.

As shown, reset circuit 300 may reset sensing circuit 850 by power cycling controller 800. Specifically, controller power supply 218 is decreased from $t_0$ to $t_1$, such that controller 800 is adjusted from an ON state to an OFF state at $t_1$. After decreasing power supply 218, a time delay is provided from $t_1$ to $t_2$. As described herein, the time delay may be provided by a delay circuit 350 of reset circuit 300. After the time delay from $t_1$ to $t_2$, controller power supply 218 is increased such that controller 800 is adjusted from the OFF state to the ON state at $t_2$.

As previously described, a reset signal 214 may initiate the reset of sensing circuit 850. At to, a reset is initiated when reset signal 214 is provided (e.g., adjusted from a low state to a high state). Accordingly, reset signal 214 may be a digital signal such as a binary digital signal provided by controller 800. In some embodiments, reset signal 214 is a general purpose input output (GPIO) signal provided by a general-purpose input/output (GPIO) peripheral of controller 800.

As shown in FIG. 5, enable signal 216 falls rapidly from high to low at in response to reset signal 214 being provided (e.g., when the reset is initiated). Similarly, controller power supply 218 begins to dissipate in response to enable signal 216 falling below a voltage threshold (e.g., V_STOP). Controller power supply 218 falls until controller 800 can no longer operate at $t_1$. At $t_1$, the controller is adjusted from an ON state to an OFF state due to the lack of power. In response, reset signal 214 is no longer provided to the reset circuit 300 (e.g., returns to the low state) at $t_1$ as the controller 800 is no longer operating (e.g., in the OFF state). When reset signal 214 is no longer provided, external power source 250 begins to charge reset circuit 300 (e.g., delay circuit 350 of reset circuit 300), increasing the voltage of enable signal 216. Enable signal 216 continues to increase in voltage until enable signal 216 reaches a voltage threshold (e.g., V_START) that enables power circuit 500 to turn on controller power supply 218. This is accomplished at $t_2$ when controller power supply 218 has returned to the operating voltage level of controller 800. Accordingly, controller 800 initializes sensing circuit 850 upon restart, recovering sensing circuit 850 from the fault state.

Figure 6:
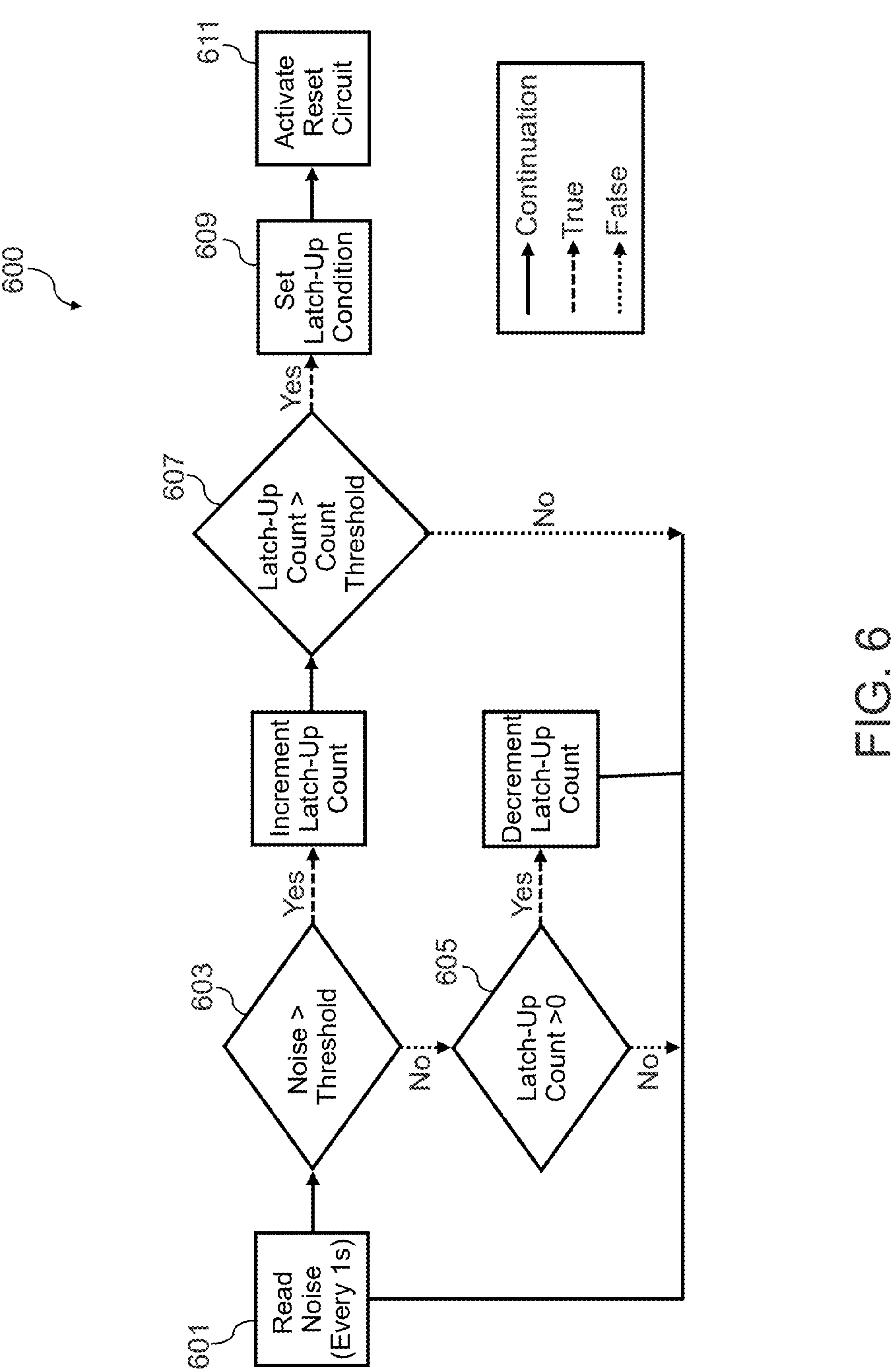
FIG. 6 depicts a flowchart of an example method for detecting a fault condition in a sensing circuit according to example embodiments of the present disclosure.

FIG. 6 depicts a flowchart of a method 600 for detecting a fault condition in a capacitive touch sensing circuit according to example embodiments of the present disclosure. While method 600 is described with reference to fault reset system 200 as shown in FIG. 2 (e.g., controller 800 of system 200), those of ordinary skill in the art will understand that method 600 can be implemented by any suitable fault reset system for an appliance. For example, method 600 can be implemented by a fault reset system in any appliance with one or more capacitive touch sensors such as an oven, a refrigerator, a dishwasher, a microwave oven, a cooktop, a washing machine, a dryer, a water heater, a water filter, a water purifier, an air conditioner, or a space heater.

Method 600 depicts a method for determining a fault state of a sensing circuit based on one or more noise levels of the one or more sensor values. Specifically, method 600 includes determining if a sensor value is a high-noise sensor value or a low noise sensor value. For each high-noise sensor value determined, a counter value is incremented. For each low-noise sensor value, the counter value is decremented. When the counter value is greater than a count threshold, the sensing circuit is determined to be in a fault state and reset signal 214 is provided to reset circuit 300.

As previously discussed, controller 800 is configured to receive one or more sensor signals from one or more capacitive touch sensors 132 (e.g., via one or more GPIO signals or shared communication busses). As such, method 600 includes cycling through each capacitive touch sensor of the one or more capacitive touch sensors 132. For example, each time method 600 returns to 601, a noise level of a sensor value of another capacitive touch sensor is determined for each capacitive touch sensor in the one or more capacitive touch sensors 132.

Method 600 begins at 601 as controller 800 reads a noise level of a sensor value. As described above in reference to FIG. 2, sensing circuit 850 of controller 800 is configured to determine a sensor value based on sensor signal 212. As such, controller 800 is configured to read (e.g., determine) a noise level of the sensor value. The noise level of a sensor value may be determined by measuring the peak to peak noise of a sensor value over a sampling time period, such as over 1 second.

At 603, the noise level of the sensor value is compared to a predetermined noise threshold value to determine if the sensor value is a high-noise sensor value or a low-noise sensor value. If the noise value is less than the predetermined noise threshold value (e.g., a low-noise sensor value), the method moves to 605. At 605, a counter value (e. g., a latch-up counter value) is decremented if the counter value is greater than zero. Method 600 then returns to 601 to restart the method with a sensor value of another capacitive touch sensor of the one or more capacitive touch sensors 132.

Referring back to 603, if the noise value is greater than the predetermined noise threshold value, the counter value is incremented and method 600 moves to 607. At 607, the counter value is compared to a count threshold. If the counter value is less than the count threshold, method 600 returns to 601 to restart the method. Alternatively, if the counter value is found to be greater than the count threshold at 607, sensing circuit 850 is determined to be in a fault state. As such, method 600 then sets a latch-up condition at 609 and provides reset signal 214 to reset circuit 300 at 611, initiating a reset of sensing circuit 850.

Figure 7:
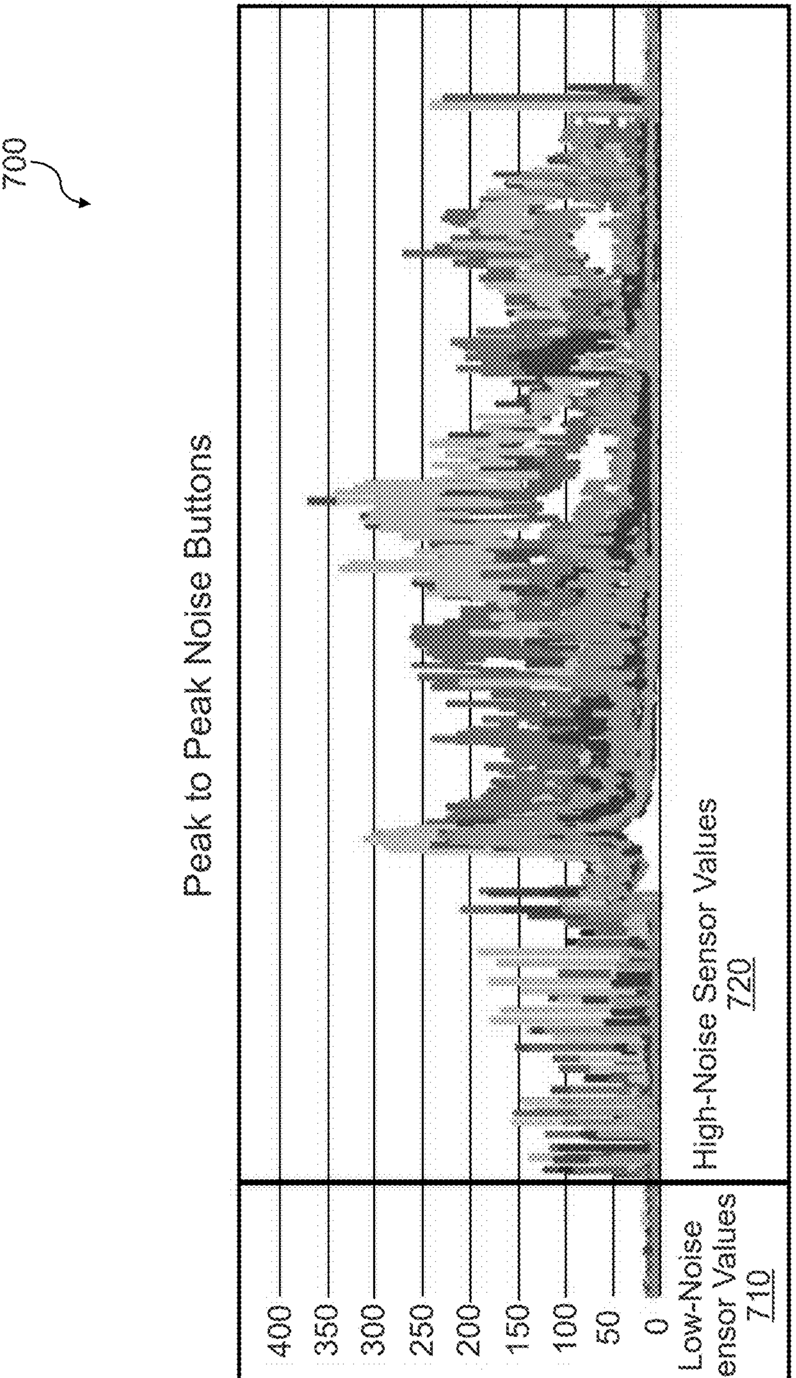
FIG. 7 provides a plot of example noise levels of example sensor values according to example embodiments of the present disclosure.

Referring now to FIG. 7, a plot 700 of example noise levels of sensor values according to example embodiments of the present disclosure is provided. Specifically, plot 700 illustrates the difference between low-noise sensor values 710 and high-noise sensor values 720. The vertical axis of plot 700 refers to counts as determined by a controller while the horizontal axis depicts samples, which may be translated to time. Plot 700 depicts sensor values determined by a sensing circuit of the controller when in normal operation, and in the fault state. For example, low-noise sensor values 710 are shown with noise levels less than 10 counts. This may indicate that the sensing circuit is in normal operation (e.g., not in a fault state). When the controller enters the fault state, the sensing circuit may read out high-noise sensor values 720 with noise levels exceeding 200 counts. These elevated noise levels may not be indicative of real input to the capacitive touch sensors. Accordingly, the sensing circuit may be in a fault state when it reads out the incorrect values.

Figure 8:
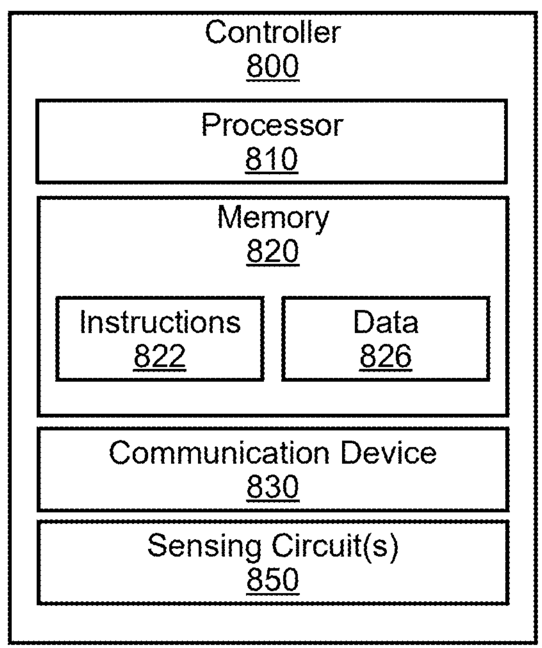
FIG. 8 depicts a block diagram of an example controller according to example embodiments of the present disclosure.

FIG. 8 depicts a block diagram of a controller 800 according to example embodiments of the present disclosure. Furthermore, example methods described herein may be implemented using the example controller 800 of FIG. 8. In some embodiments, controller 800 may be defined as a microcontroller.

Embodiments of the controller 800 include one or more processor(s) 810, memory 820, and a communication device 830. The processor 810 may include a microprocessor, CPU or the like, such as a general or special purpose microprocessor operable to execute programming instructions or micro-control code. The processor 810 may operate to execute processes and/or functions described within the present disclosure. In some embodiments, processor 810 may execute programming instructions or micro-control code associated with operation of an appliance, such as cooktop appliance 100 shown in FIG. 1.

Memory 820 represents computer readable memory that is accessible to the controller 800. Memory 820 may represent random access memory such as DRAM, or read only memory such as ROM or FLASH. In one embodiment, the processor 810 executes programming instructions 822 stored in memory 820. Data 826 be saved in memory 820 and be accessible to the controller 800. Memory 820 may be a separate component from the processor 810 or may be included onboard within the processor 810. The communication device 830 provides a wired and/or wireless communications bus to send and/or receive signals.

Controller 800 further includes sensing circuit(s) 850 (e.g., internal capacitive touch sensing circuit(s)). Sensing circuit(s) 850 is configured to determine a sensor value associated with capacitive touch sensor. Specifically, sensing circuit(s) 850 may determine a sensor value by detecting a change in the capacitance of a sensor. The order of magnitude of the changes in capacitance detected by sensing circuit(s) 850 may be in the picofarad range. Sensing circuit(s) 850 may be defined as an internal peripheral positioned within the housing of controller 800. Furthermore, sensing circuit(s) 850 share a power source with controller 800, such that sensing circuit(s) 850 may be configured to permanently remain in an ON state while controller 800 is in an ON state. In some embodiments, sensing circuit(s) 850 may be a microprocessor located within the housing of controller 800.

Figure 9:
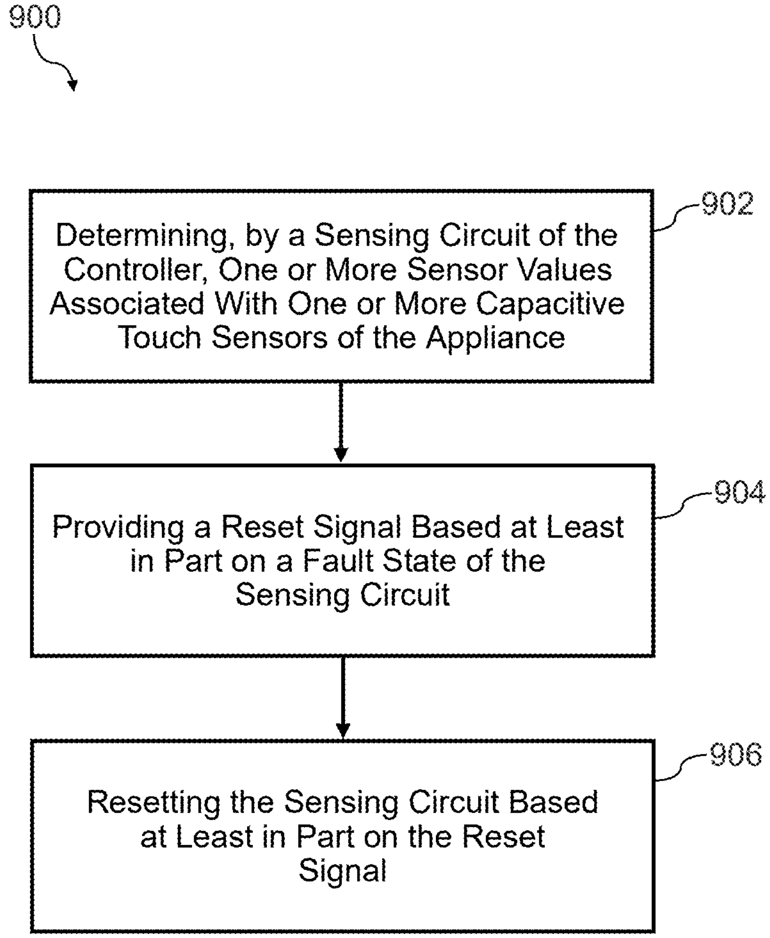
FIG. 9 depicts a flowchart of an example method for resetting a controller in an appliance according to example embodiments of the present disclosure.

FIG. 9 depicts a flowchart of an example method 900 for resetting a controller in an appliance according to example embodiments of the present disclosure. Those of ordinary skill in the art, using the disclosures provided herein, will understand that various steps of any of the methods described herein can be omitted, expanded, performed simultaneously, rearranged, and/or modified in various ways without deviating from the scope of the present disclosure. Furthermore, various steps (not illustrated) can be performed without deviating from the scope of the present disclosure. Additionally, method 900 may be performed by fault reset system 200 as depicted in FIG. 2. While method 900 is generally described with reference to fault reset system 200 (e.g., controller 800 of system 200), those of ordinary skill in the art will understand that method 900 can be implemented by any suitable fault reset system for an appliance. For example, method 900 can be implemented by a fault reset system in any appliance with one or more capacitive touch sensors such as an oven, a refrigerator, a dishwasher, a microwave oven, a cooktop, a washing machine, a dryer, a water heater, a water filter, a water purifier, an air conditioner, or a space heater.

At 902, method 900 includes determining, by one or more sensing circuits of the controller, one or more sensor values associated with one or more capacitive touch sensors of the appliance. For example, sensing circuit 850 of controller 800 can determine one or more sensor values associated with one or more capacitive touch sensors 132 of an appliance such as cooktop appliance 100.

At 904, method 900 includes adjusting a reset signal based at least in part on a sensor value of the one or more sensor values. For example, controller 800 can adjust reset signal 214 based at least in part on a sensor value of the one or more sensor values.

At 906, method 900 includes resetting the one or more sensing circuits based at least in part on the reset signal. Resetting the one or more sensing circuits includes power cycling the controller. For example, reset circuit 300 can reset the one or more sensing circuits 850 based at least in part on reset signal 214. Reset circuit 300 can reset the one or more sensing circuits 850 by power cycling controller 800. In some implementations, at 906, power cycling the controller includes decreasing a power supply of the controller such that the controller is adjusted from an ON state to an OFF state, providing a time delay, and increasing the power supply of the controller such that the controller is adjusted from the OFF state to the ON state. For example, power circuit 500 can decrease controller power supply 218 of controller 800 from an ON state to an OFF state, delay circuit 350 of reset circuit 300 can provide a time delay, and power circuit 500 can increase controller power supply 218 of controller 800 from the OFF state to the ON state.

One example aspect of the present disclosure is directed to a fault reset system for an appliance. The fault reset system includes a controller comprising a sensing circuit, the sensing circuit configured to determine one or more sensor values associated with one or more capacitive touch sensors of the appliance. The fault reset system further includes a reset circuit configured to reset the sensing circuit based on a reset signal provided by the controller. The reset circuit is configured to reset the sensing circuit by power cycling the controller.

In some examples, the sensing circuit shares a power source with the controller.

In some examples, the reset signal is a general purpose input/output (GPIO) signal.

In some examples, the reset signal is based at least in part on a fault state of the sensing circuit.

In some examples, the fault state of the sensing circuit is based at least in part on one or more noise levels of the one or more sensor values.

In some examples, power cycling the controller includes decreasing a power supply of the controller such that the controller is adjusted from an ON state to an OFF state. Power cycling the controller further includes, after decreasing the power supply of the controller, providing, by a delay circuit of the reset circuit, a time delay. Power cycling the controller further includes, after the time delay, increasing the power supply of the controller such that the controller is adjusted from the OFF state to the ON state.

In some examples, the delay circuit is an RC circuit.

In some examples, the reset circuit includes a buffer switch configured to protect the controller.

In some examples, the sensing circuit is positioned within a device package of the controller.

Another example aspect of the present disclosure is directed to a method for resetting a controller in an appliance. The method includes determining, by a sensing circuit of the controller, one or more sensor values associated with one or more capacitive touch sensors of the appliance. The method further includes providing a reset signal based at least in part on a fault state of the sensing circuit. The method further includes resetting the sensing circuit based at least in part on the reset signal. Resetting the sensing circuit includes power cycling the controller.

In some examples, the sensing circuit shares a power source with the controller.

In some examples, the reset signal is a general purpose input/output (GPIO) signal.

In some examples, the fault state of the sensing circuit is based at least in part on one or more noise levels of the one or more sensor values.

In some examples, the reset signal is provided when a counter value is greater than a count threshold, the counter value being incremented by a high-noise sensor value and decremented by a low-noise sensor value.

In some examples, power cycling the controller includes decreasing a power supply of the controller such that the controller is adjusted from an ON state to an OFF state. Power cycling the controller further includes, after decreasing the power supply of the controller, providing, by a delay circuit of the reset circuit, a time delay. Power cycling the controller further includes, after the time delay, increasing the power supply of the controller such that the controller is adjusted from the OFF state to the ON state.

In some examples, the sensing circuit is positioned within a device package of the controller.

Another example aspect of the present disclosure is directed to an appliance. The appliance includes one or more capacitive touch sensors configured to provide one or more sensor signals. The appliance further includes a fault reset system. The fault reset system includes a controller comprising a sensing circuit, the sensing circuit configured to determine one or more sensor values associated with one or more capacitive touch sensors based on the one or more sensor signals. The fault reset system further includes a reset circuit configured to reset the sensing circuit based on a reset signal provided by the controller. The reset circuit is configured to reset the sensing circuit by power cycling the controller.

In some examples, the reset signal is based at least in part on one or more noise levels of the one or more sensor values.

In some examples, the reset signal is provided when a counter value is greater than a count threshold, the counter value being incremented by a high-noise sensor value and decremented by a low-noise sensor value.

In some examples, the appliance is a cooktop appliance.

While the present subject matter has been described in detail with respect to specific example embodiments thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A fault reset system for an appliance, comprising:

a controller comprising a sensing circuit, the sensing circuit configured to determine one or more sensor values associated with one or more capacitive touch sensors of the appliance; and a reset circuit configured to reset the sensing circuit based on a reset signal provided by the controller, wherein the reset circuit is configured to reset the sensing circuit by power cycling the controller, and wherein power cycling the controller comprises:

decreasing a power supply of the controller such that the controller is adjusted from an ON state to an OFF state;

after decreasing the power supply of the controller, providing, by a delay circuit of the reset circuit, a time delay; and after the time delay, increasing the power supply of the controller such that the controller is adjusted from the OFF state to the ON state.

2. The system of claim 1, wherein the sensing circuit shares a power source with the controller.

3. The system of claim 1, wherein the reset signal is a general purpose input/output (GPIO) signal.

4. The system of claim 1, wherein the reset signal is based at least in part on a fault state of the sensing circuit.

5. The system of claim 4, wherein the fault state of the sensing circuit is based at least in part on one or more noise levels of the one or more sensor values.

6. The system of claim 1, wherein the delay circuit is an RC circuit.

7. The system of claim 1, wherein the reset circuit includes a buffer switch configured to protect the controller.

8. The system of claim 1, wherein the sensing circuit is positioned within a device package of the controller.

9. A method for resetting a controller in an appliance, comprising:

determining, by a sensing circuit of the controller, one or more sensor values associated with one or more capacitive touch sensors of the appliance;

providing a reset signal based at least in part on a fault state of the sensing circuit; and resetting the sensing circuit based at least in part on the reset signal, wherein resetting the sensing circuit includes power cycling the controller, and wherein power cycling the controller comprises:

decreasing a power supply of the controller such that controller is adjusted from an ON state to an OFF state;

after decreasing the power supply of the controller, providing a time delay; and after the time delay, increasing the power supply of the controller such that the controller is adjusted from the OFF state to the ON state.

10. The method of claim 9, wherein the sensing circuit shares a power source with the controller.

11. The method of claim 9, wherein the reset signal is a general purpose input/output (GPIO) signal.

12. The method of claim 9, wherein the fault state of the sensing circuit is based at least in part on one or more noise levels of the one or more sensor values.

13. The method of claim 12, wherein the reset signal is provided when a counter value is greater than a count threshold, the counter value being incremented by a high-noise sensor value and decremented by a low-noise sensor value.

14. The method of claim 9, wherein the sensing circuit is positioned within a device package of the controller.

15. An appliance, comprising:

one or more capacitive touch sensors configured to provide one or more sensor signals; and a fault reset system, comprising:

a controller comprising a sensing circuit, the sensing circuit configured to determine one or more sensor values associated with the one or more capacitive touch sensors based on the one or more sensor signals; and a reset circuit configured to reset the sensing circuit based on a reset signal provided by the controller, wherein the reset circuit is configured to reset the sensing circuit by power cycling the controller, and wherein power cycling the controller comprises:

decreasing a power supply of the controller such that controller is adjusted from an ON state to an OFF state;

after decreasing the power supply of the controller, providing a time delay; and after the time delay, increasing the power supply of the controller such that the controller is adjusted from the OFF state to the ON state.

16. The appliance of claim 15, wherein the reset signal is based at least in part on one or more noise levels of the one or more sensor values.

17. The appliance of claim 16, wherein the reset signal is provided when a counter value is greater than a count threshold, the counter value being incremented by a high-noise sensor value and decremented by a low-noise sensor value.

18. The appliance of claim 15, wherein the appliance is a cooktop appliance.

* * * * *